United States Patent [19]

White et al.

[11] Patent Number: 4,751,250

[45] Date of Patent: Jun. 14, 1988

[54] PROCESS FOR FOAMING THERMOPLASTIC

[75] Inventors: Roger J. White; Sivaram Krishnan, both of Pittsburgh, Pa.

[73] Assignee: Mobay Corporation, Pittsburgh, Pa.

[21] Appl. No.: 863,229

[22] Filed: May 14, 1986

[51] Int. Cl.$^4$ .............................................. C08J 9/10
[52] U.S. Cl. .................................... 521/94; 521/134; 521/138; 521/139; 521/180; 521/182
[58] Field of Search ................. 521/94, 134, 138, 139, 521/180, 90, 182

[56] References Cited

U.S. PATENT DOCUMENTS

| | | | |
|---|---|---|---|
| 3,888,801 | 6/1975 | Hunter et al. ......................... | 260/2.5 |
| 4,207,402 | 6/1980 | Sprenkle, Jr. ......................... | 521/139 |
| 4,420,584 | 12/1983 | Rawlings ............................. | 524/502 |

*Primary Examiner*—Morton Foelak
*Attorney, Agent, or Firm*—Gene Harsh; Joseph C. Gil; Aron Preis

[57] ABSTRACT

The present invention relates to an improvement in preparing foamed thermoplastic articles. It was found that a chemical blowing agent concentrate which contains a blowing agent which produces primary amines upon decomposition and additionally contains an anhydride compound which contains at least one cyclic anhydride in its structure, offers surprising advantages over the prior art process in terms of improved impact strength and process flexibility.

11 Claims, No Drawings

PROCESS FOR FOAMING THERMOPLASTIC

FIELD OF THE INVENTION

The present invention is directed to an improved process for making foamed thermoplastic moldings.

SUMMARY OF THE INVENTION

The present invention relates to an improvement in preparing foamed thermoplastic articles. It was found that a chemical blowing agent concentrate which contains a blowing agent which agent produces primary amines upon its decomposition and where concentrate additionally comprises an anhydride compound which contains at least one cyclic anhydride in its structure, offers surprising advantages in terms of improved impact strength and process flexibility.

BACKGROUND OF THE INVENTION

Foamable molding compositions containing chemical blowing agents are known. U.S. Pat. No. 3,888,801 discloses the chemical blowing agents which are suitable in the context of the present invention. Resins which are suitable in the present invention are also disclosed in that patent.

Polycarbonate compositions having an improved level of impact strength comprising an aromatic polycarbonate, glass fibers and a polyanhydride have been disclosed in U.S. Pat. No. 4,420,584. U.S. Pat. No. 4,207,402 discloses foamable compositions comprising certain addition polymers in combination with an interpolymer of an alkyl aromatic monomer and maleic anhydride and a particular foaming agent. The advantages said to be associated with the invention relates to the attainments of shorter molding cycles.

DETAILED DESCRIPTION OF THE INVENTION

An earlier patent application, Ser. No. 774,679 which was filed Sept. 9, 1985, now abandoned, was directed to foamable thermoplastic molding compositions exhibiting an improved impact resistance. In accordance with that invention there was provided a composition comprising a thermoplastic resin, a nucleating agent, a chemical blowing agent and an anhydride. In practicing the earlier invention, there were fed to the molding machine a mixture of (a) resinous pellets containing an anhydride and (b) a chemical blowing agent concentrate which comprised up to about 10% by weight of a chemical blowing agent (CBA) the balance being substantially the same resin as that used in (a). The present invention is an improvement to the process and entails including the anhydride in the concentrate (b) and not in (a). The improved process produces better molding and affords better process flexibility.

The polymeric resin component of the composition of the invention is a thermoplastic resin which is both suitable for foaming, i.e. foamable, and is sensitive to the foaming agent's decomposition products which contain primary amines, for instance, an amino urazole. Sensitivity in the present context is considered to be a tendency towards structural degradation, expressed for instance, as a reduction in molecular weight resulting upon exposing the resins to the decomposition products at the molding temperature of the resin. Among the sensitive resins mentioned may be made of polycarbonates, polyalkylene terephthalates, aromatic polyesters and polyester-carbonates. The preferred resins are polycarbonates and polyalkylene terephthalates.

In the present context, polycarbonate resins have a molecular weight (weight average) of about 10,000 to about 200,000, preferably about 20,000 to about 80,000, which may alternatively be characterized as having a melt flow rate per ASTM D-1238 at 300° C., of about 1 to about 24 gm/10 minutes, preferably about 2-6 gm/10 minutes. Polycarbonates which are suitable for the preparation of the preferred compositions of the invention are available in commerce - for instance under the tradename Merlon, from Mobay Corporation. The preparation of polycarbonate resins, preferably by interfacial condensation of certain dihydroxy compounds with phosgene has been well documented - see, for instance, the manuscript *Chemistry and Physics of Polycarbonates*, by Hermann Schnell, Interscience Publishers, 1964, which is incorporated by reference herein.

Dihydroxy compounds suitable for the preparation of the polycarbonates of the invention to conform to the structural formulae (1) or (2)

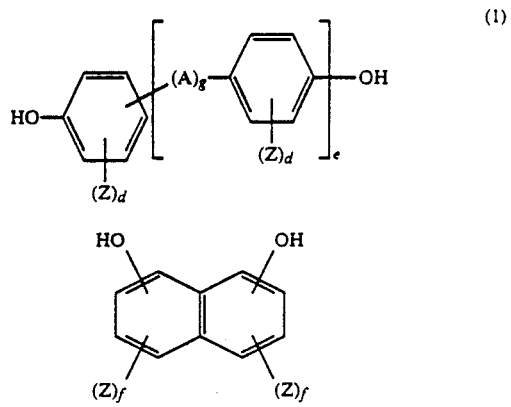

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or —SO$_2$— radical; or a radical of the general formula

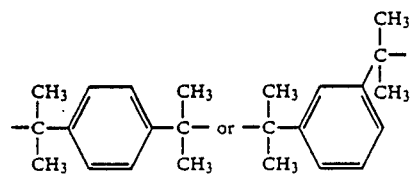

g denotes the number 0 or 1;
e denotes the number 0 or 1;
Z denotes F, Cl, Br or a C$_1$–C$_2$ alkyl and if several Z radicals are substituents in one aryl radical, they may be identical or different one from the other;
d denotes 0 or an integer of from 1 to 4; and
f denotes 0 or an integer of from 1 to 3.

Among the useful dihydroxy compounds in the practice of the invention are hydroquinone, resorcinal, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfide, bis-(hydroxyphenyl)-sulfones and α,α-bis(hydroxyphenyl)-diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, *Chemistry and Physics of Polycarbonates*, Interscience Publishers, New York, 1964. Further examples of suitable bisphenols are 2,2-bis-(hydroxyphenyl)-propane (bisphenol A), 2,2-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenyl.

The most preferred dihydroxy compound is 2,2-bis-(4-hydroxyphenyl)-propane (bisphenol A).

The polycarbonates of the invention may entail in their structure, units derived from one or more of the suitable dihydroxy compounds.

The preparation of polycarbonate resins may be carried out in accordance with any of the processes known in the art, for example, by the interfacial polycondensation process, polycondensation in a homogeneous phase or by transesterification. The suitable processes and the associated reactants, catalysts, solvents and conditions are known in the art and have been described in German Pat. Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273, all incorporated herein by reference.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol % (relative to diphenols employed), of trifunctional or more than trifunctional compounds, especially compounds having three or more aromatic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three aromatic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-hydroxyphenylisopropyl)-phenoxy)-methane and 1,4-bis-(4',4''-dihydroxytriphenyl)-methyl-benzene. Some of the other trifunctional compounds are 2,4-dihydroxy-benzoic acid, trimesic acid, cyanuric acid and 3,3-bis-(4-hydroxyphenyl)-2-oxo-2,3-dihydroindole.

The polyalkylene terephthalate resins which are suitable in the present context are known. The preferred species, polyethylene terephthalate (PET) and polybutylene terephthalate (PBT) are available in commerce. Processes for their preparation are known and have been described in, among others, U.S. Pat. Nos. 2,465,319 and 3,047,539, both incorporated herein by reference.

Aromatic polyesters and polyester-carbonates are known in the art. These have been described in the following documents, all of which are incorporated herein by reference. U.S. Pat. Nos. 4,252,939; 4,260,731; 4,360,648; 4,338,422; 4,369,303; 3,030,331; 3,169,121; 3,110,698; 4,130,548; 4,240,968 and 4,330,662. Also incorporated by reference in this connection are German Pat. Nos. 2,232,877; 1,495,626; 1,495,302; 2,753,230; 3,016,020; French Pat. No. 1,492,430; European Patent Nos. 8492; 10840; 17740; 28353 and 50847; and the article "Synthesis of Poly(ester Carbonate) Copolymers", D. C. Prevorsek et al, *Journal of Polymer Science: Polymer Chemistry Edition,* Vol. 18, 75–90 (1980).

The blowing agent in the present context is characterized in that among its thermal decomposition products there exists a primary amine, preferably an amino urazole. Among the suitable agents, there are hydrazodicarboxylates which are noted for the great volume of gas evolution attendant upon their thermal decomposition. These hydrazodicarboxylates conform to

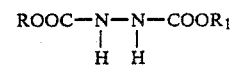

where R and $R_1$ independently denote a member selected from the group consisting of primary, secondary and tertiary straight-chain or branched-chain $C_1$–$C_8$ alkyl, $C_5$–$C_8$ cycloalkyl, $C_6$–$C_{10}$ aryl, $C_7$–$C_{10}$ aralkyl and $C_7$–$C_{10}$ alkaryl radicals. Preferred species have at least one of R and $R_1$ selected from the group consisting of isopropyl, secondary butyl and tertiary butyl and the other of R and $R_1$ is a $C_1$–$C_4$ alkyl. Most preferred species are those wherein both R and $R_1$ are selected from the group consisting of isopropyl, secondary butyl and tertiary butyl. The foaming agent most suitable is diisopropylhydrazodicarboxylate:

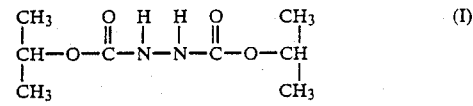

(I)

U.S. Pat. No. 3,888,801, which disclosure is incorporated herein by reference, contains further information respecting the hydrazodicarboxylates of the invention. The most suitable foaming agent may be prepared in accordance with the technique disclosed in U.S. Pat. No. 3,888,801. This agent is characterized in that its melting temperature is about 221°–224° F. and its decomposition temperature is about 520°–590° F. Upon its decomposition, it generates an amount of 4-aminourazole corresponding to about 15% of its original weight.

The anhydride of the invention is a compound containing at least one cyclic anhydride. Preferably the anhydride is a polymeric compound containing at least one cyclic anhydride, preferably maleic acid anhydride, in its repeating unit; most preferably the anhydride is a copolymer of maleic acid anhydride and at least one olefin. Examples of suitable olefins are styrene, vinyl ether and methyl vinyl ether. Among the suitable are anhydrides which are represented by the structural formula:

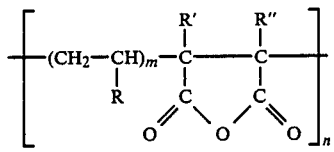

where R is a substituted or an unsubstituted radical selected from the group consisting of $C_6$–$C_{12}$ phenyl, $C_1$–$C_{12}$ alkoxy and $C_1$–$C_{28}$ alkyl radicals. In general, the carbon atoms of R may not be greater in number than 28, R' and R" independently are hydrogen or a halogen atom or a $C_1$–$C_3$ alkyl radical, n is an integer of from 1 to 200, and m is an integer of from 1 to 5. In one preferred embodiment, n is about 145 and m is 1. The preparation of a suitable anhydride, namely a copolymer of maleic anhydride and an α-olefin is described in U.S. Pat. No. 3,586,659, hereby incorporated by reference. Examples of olefin compounds suitable for forming the anhydride of the composition include: ethylene; 1-propane; 1-decene; 1-butene; 1-undecene; 1-isobutylene; 1-hexene; 1-dodecene; 1-pentene; 1-tridecene; 1-heptene; 1-octene; 1-tetradecene; 1-octadecene; 1-nonadecene; styrene; 1-nonene and mixtures thereof.

The copolymerization procedure may involve contacting the olefinic compound with the maleic anhydride in a suitable solvent in the presence of a catalyst. The molar ratio of the mono-α-olefin to maleic anhydride is desirably between about 1:1 and 8:1.

Additionally, the concentrate of the invention may contain an amount of a nucleating agent sufficient to bring about a uniform size distribution of the cells. Preferably, the amount of the nucleating agent is about 0.05 to 5% relative to the weight of the composition. The nucleating agents for structural foams are well known in the art and among them, mention may be made of glass fibers and milled glass.

In the practice of the invention, the chemical blowing agent concentrate (CBA) consists essentially of a resinous material which is the same as or is compatible with the resin to be molded, a chemical blowing agent and an anhydride. Typically, the chemical blowing agent concentrate of the invention comprises at least 50% resin, the balance being of the chemical blowing agent and the anhydride. In a preferred embodiment the amount of the resin in the chemical blowing agent concentrate is 50 to 95% and the relative amounts of chemical blowing agents and anhydride may vary but preferably are ranged from 1:4 to 8:1. In the practice of the invention, the chemical blowing agent concentrates are added to the resin to be foamed in an amount calculated to bring about a predetermined, desired amount of foaming. Typically the amount of CBA ranges from about 0.5 to about 5%, preferably 1 to 4% by weight relative to the weight of the resin.

The invention is further illustrated, but is not intended to be limited by the following examples in which all parts and percentages are by weight unless otherwise specified.

EXPERIMENTAL Moldings in accordance with the practice of the invention were prepared and their properties determined. The table below summarizes the properties of several moldings. The chemical blowing agent concentrate contained 10% by weight of the chemical agent conforming to formula 1 above. The anhydride was a mixture, as indicated, of a styrene/maleic anhydride copolymer containing approximately 12% of anhydride-anhydride A and a 1:1 copolymer of ethylene/maleic anhydride-anhydride B. The ratio between the components of the anhydride mixture is indicated in the table. The amount of the anhydride present in the concentrate is the sum total of the indicated percentages. The polycarbonate resin of the concentrate used in the course of these experiments is Merlon-M40 which is a homopolymer based on bisphenol A and is a commercial product of Mobay Corporation. The composition also contained about 5% of glass fibers and a flame retardant package the glass serving as a nucleating agent and the flame retardant having no criticality in the present context. The processing of the concentrate and the molding was in accordance with the invention in that the concentrate contained the chemical blowing agent and the anhydride. The processing parameters were conventional.

| Composition[1] | 1 | 2 | 3 | 4 | 5 |
|---|---|---|---|---|---|
| Anhydride ratio[2] | 0.0 | 22.5/6.5 | 30/4.3 | 33.8/3.3 | 67.5/0 |
| Relative viscosity | 1.228 | 1.257 | 1.258 | 1.252 | 1.252 |
| Impact strength Total E @ failure[3] in. lbs. | 272.9 | 460.6 | 440.5 | 419.9 | 386.9 |
| Std. deviation | 60.3 | 66.9 | 74.5 | 53.8 | 41.3 |

[1]The compositions 1–5 contained 5% of the chemical blowing agent concentrate.
[2]Ratio by weight of anhydride A to anhydride B.
[3]Fracture energy.

The table below is a summary of the result of testing an additional series of molded compositions, 6–10 which contained 2.5% of the chemical blowing agent concentrate.

| Composition[1] | 6 | 7 | 8 | 9 | 10 |
|---|---|---|---|---|---|
| Anhydride ratio[2] | 0:0 | 22.5/6.5 | 30/4.3 | 33.8/3.3 | 67.5/0 |
| Relative viscosity | 1.259 | 1.281 | 1.287 | 1.277 | 1.268 |
| Impact strength Total E @ failure[3] in. lbs. | 390.6 | 466.3 | 462.8 | 467.2 | 474.1 |
| Std. deviation | 67.8 | 26.9 | 18.5 | 20.4 | 12.4 |

[1]The compositions 1–5 contained 2.5% of the chemical blowing agent concentrate.
[2]Ratio by weight of anhydride A to anhydride B.
[3]Fracture energy.

The main advantage offered by the present invention is seen in that the compounding of the anhydride with the chemical blowing agent results in that it is subjected to a less severe heat history and is therefore more color stable. Importantly, in the prior art process the anhydride is incorporated in the base resin and the impact strength advantages are substantially lost with increasing the amount of the blowing agent concentrate. In the process in accordance with the invention, an increased amount of blowing agent concentrate (from 2.5% to 5%) does not greatly effect the impact strength of the resulting foamed structure. Further, the inclusion of the anhydride in the chemical blowing agent concentrates, enables better control of the final properties of the molding.

EXAMPLE 2

A series of chemical blowing concentrates containing the chemical blowing agent of formula 1, a polycarbonate resin (Merlon FCR from Mobay Corporation) and any of a variety of anhydrides have been prepared using a 1½" extruder following conventional pelletizing techniques. The results showed that the concentrate preferably contains at least 3 equivalents of anhydride per 1 equivalent of amino-urazole. At levels higher than 8 equivalents of anhydride, the impact resistance of moldings containing 3% concentrate drops off.

The compositions of the invention may contain further additives which are known in the art for their efficacy in the context of foamable molding compositions. These include various reinforcing agents, fillers, pigments and dyes, plasticizers, UV and hydrolysis stabilizers, flame retardants, drip suppresants and mold release agents. The mixing of the components may be carried out in a known manner utilizing known equipment. Preferably, mixing may be carried out in an extruder.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the process of producing a foamed article of a thermoplastic resin using a chemical blowing agent of which decomposition products contain a primary amine and which process includes the use of a chemical blowing agent concentrate the improvement comprising incorporating in said concentrate at least one anhydride in an amount sufficient to promote the impact strength of said foamed article, said resin being characterized in that it is sensitive to said decomposition product.

2. The improvement of claim 1 wherein the said anhydride is a polymeric compound.

3. The improvement of claim 2 wherein the amount by weight of said chemical blowing agent relates to the amount by weight of said polymeric compound in the range of 1:4 to 8:1.

4. The improvement of claim 1 wherein about 50 to 95% of said concentrate consists of said thermoplastic resin.

5. The improvement of claim 1 wherein said thermoplastic resin is selected from the group consisting of polycarbonate, polyalkylene terephthalate, aromatic polyester, and polyester-carbonate.

6. The improvement of claim 1 wherein said chemical blowing agent concentrate is used in an amount of 1 to 10%.

7. The improvement of claim 2 wherein said polymeric compound contains maleic acid anhydride in its repeating unit.

8. The improvement of claim 7 wherein said anhydride conforms to

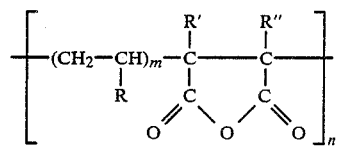

wherein R is H or a substituted or an unsubstituted radical selected from the group consisting of $C_6$–$C_{12}$ phenyl, $C_1$–$C_{12}$ alkoxy and $C_1$–$C_{28}$ alkyl radicals, n is an integer of from about 1 to 200, m is about 1 to 5, and R' and R" independently are hydrogen or a halogen atom or a $C_1$–$C_3$ alkyl radical.

9. The improvement of claim 1 wherein said blowing agent conforms to

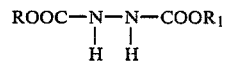

wherein R and $R_1$ independently denote a member selected from the group consisting of primary, secondary and tertiary straight chain or branched chain $C_1$–$C_8$ alkyl, $C_5$–$C_8$ cycloalkyl, $C_6$–$C_{10}$ aryl, $C_7$–$C_{10}$ aralkyl, and $C_7$–$C_{10}$ alkaryl radicals.

10. The improvement of claim 9 wherein at least 1 of R and $R_1$ is selected from the group consisting of isopropyl, secondary butyl and tertiary butyl radicals and the other of R and $R_1$ is $C_{1-4}$ alkyl.

11. The improvement of claim 10 wherein said blowing agent is diisopropylhydrazodicarboxylate.

* * * * *